(12) United States Patent
Liang et al.

(10) Patent No.: US 6,351,376 B1
(45) Date of Patent: Feb. 26, 2002

(54) COMPUTER DATA STORAGE DEVICE MOUNTING APPARATUS

(75) Inventors: Pouch Liang; Hsuan-Tsung Chen, both of Lin-Kou (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/458,122

(22) Filed: Dec. 8, 1999

(30) Foreign Application Priority Data

Apr. 16, 1999 (TW) ...................................... 88205884 U

(51) Int. Cl.[7] .................................................. G06F 1/16
(52) U.S. Cl. ........................ 361/685; 361/679; 361/683; 361/684; 361/685; 361/686; 361/724; 361/725; 361/726; 361/727; 361/728; 361/729; 361/730; 361/731; 361/732; 361/733; 361/740; 361/741; 361/747; 361/312; 361/223.1; 361/223.2; 361/248; 361/222.1; 361/224.4; 361/681; 361/364; 361/708.1; 361/360; 361/97.01; 361/137
(58) Field of Search ................................ 361/679, 683, 361/684, 685, 686, 724–727, 728–733, 740, 741, 747; 312/223.1, 223.2; 248/222.1, 224.4, 681; 364/708.1; 360/97.01, 137

(56) References Cited

U.S. PATENT DOCUMENTS 5,503,472 A * 4/1996 Vu et al. ................. 312/223.2
6,122,173 A * 9/2000 Felcman et al. ............ 361/726

* cited by examiner

*Primary Examiner*—Leo P. Picard
*Assistant Examiner*—Yean-Hsi Chang
(74) *Attorney, Agent, or Firm*—Wei Te Chung

(57) ABSTRACT

A mounting apparatus for mounting a data storage device in a computer housing includes a bracket, a securing means and a flexible plate. The bracket has a first face for supporting a data storage device, a second face opposite the first face and locking holes in its front portion. The securing means is mounted to a bottom of the data storage device and is moveable with the data storage device to be slid into the corresponding locking hole of the bracket. The flexible plate has a rear end securely fixed to the second face and a front end that has an operating portion extending out of the housing for being operable to move the front end away from the front portion of the bracket. The flexible plate further defines through holes for engaging with the locking holes to releasably block the sliding movement of the data storage device.

16 Claims, 6 Drawing Sheets

COMPUTER DATA STORAGE DEVICE MOUNTING APPARATUS

BACKGROUND OF THE INVENTION

1. Field of the invention

The present invention relates to an apparatus for mounting computer components within a computer housing, and particularly to an apparatus for storing and easily installing and removing data storage devices, such as disk drives, and the like.

2. The Related Art

A number of different methods and devices are used to mount data storage devices, such as disk drives or CD-ROMs, in a computer. One method that was widely used in the past was to simply screw the data storage device directly into a cage whereby the data storage device was secured in the computer. Changing the device was cumbersome because side or top panels, or other components close beside the cage had to be removed in order to remove the screws. New developments facilitate installation and removal of data storage devices. These include the use of guide rail type devices, such as those described below.

U.S. Pat. No. 5,262,923 and Taiwan Patent Application Nos. 78201813, 79209891 disclose devices employing guide rails for mounting data storage devices. Unfortunately, the rails used in these devices are complicated and manufacturing the opposite side rails requires two sets of dies, which contributes significantly to the cost of these devices. Moreover, the side rails are attached to their data storage device by conventional screws. The problem of the time-consuming and cumbersome task of tightening or loosening screws is still not resolved.

U.S. Pat. No. 5,599,080 discloses a mounting device for a data storage device without screws. Its data storage device is secured by pushing pins integral with the rail into side holes in the data storage device. The pins are thin and flexible, and are rather easily bent during operations such as removing the data storage device from the computer. Once the pins become bent, subsequent alignment and reconnection of the data storage device to the cage can be quite difficult.

A data storage mounting device disclosed by Taiwan Patent Application No. 83202972 also has no screws. Its rail fastener is a spring metal thread whose two ends are bent for insertion through the rail and into the side holes of the data storage device. However, the spring metal thread is readily deformed, which may result in unreliable mounting. The second embodiment of Taiwan Patent Application No. 83202972 discloses an arrangement where the data storage device is directly attached to the cage of the computer by a spring metal thread. However, other devices or panels close to the cage create the problem of inconvenient access to the thread for installation or removal of the data storage device.

Further, all of the above mentioned mounting devices for data storage device comprise a cage, which contributes to the cost of the computer.

Therefore, there is a need for an improved apparatus for storing and easily removing data storage devices without the cost and shortcomings of the prior art.

SUMMARY OF THE INVENTION

It is therefore an object of the present invention to provide for the secure installation of a data storage device in a computer.

It is a further object of the present invention to enable easy and convenient installation and removal of a computer data storage device.

A mounting apparatus for mounting a data storage device in a computer housing in accordance with the present invention includes a bracket, a securing means and a flexible plate. The bracket has a first face for supporting a data storage device, a second face opposite the first face and locking holes in its front portion. The securing means is mounted to a bottom of the data storage device and is moveable with the data storage device to be slid into the corresponding locking hole of the bracket. The flexible plate has a rear end securely fixed to the second face and a front end that has an operating portion extending out of the housing for being operable to move the front end away from the front portion of the bracket. The flexible plate further defines through holes for engaging with the locking holes to releasably block the sliding movement of the data storage device.

Other objects, advantages and novel features of the invention will is become more apparent from the following detailed description of a preferred embodiment thereof when taken in conjunction with the accompanying drawings, wherein:

DETAILED DESCRIPTION OF THE PREFERRED EMBODIMENT

Figure 1:
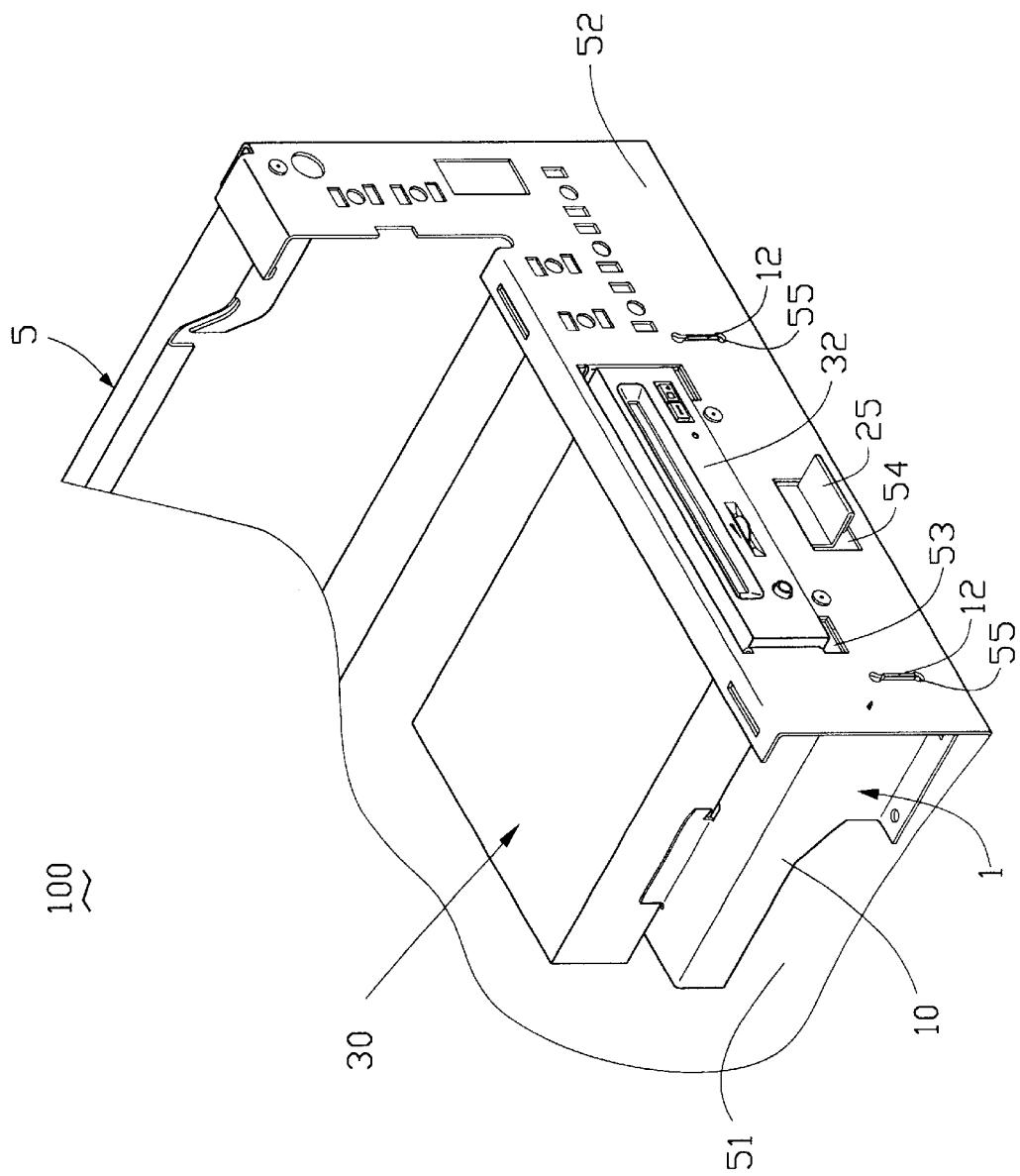
FIG. 1 is a perspective view of a data storage device mounting apparatus in accordance with the present invention installed in a computer housing.

A data storage device mounting apparatus 1 of the present invention comprises a bracket 10, a flexible plate 20 and a pair of securing means. Referring to FIG. 1, a computer housing 100 is shown which includes a chassis 5 and the data storage device mounting apparatus 1 on which a data storage device 30 is mounted. The chassis 5 has a floor 51 and a front panel 52 and defines an inner space wherein the data storage device mounting apparatus 1 can be mounted. The front panel 52 defines an elongate first opening 53 to permit the data storage device 30 to be inserted or extracted from the computer housing, and to receive a face 32 of the data storage-device 30. A second opening 54 is defined under the first opening 53 providing a space for an L-shape operating portion 25, as discussed below. A pair of slots 55 are defined in the front panel 52 at either side of the second opening 54.

Figure 2:
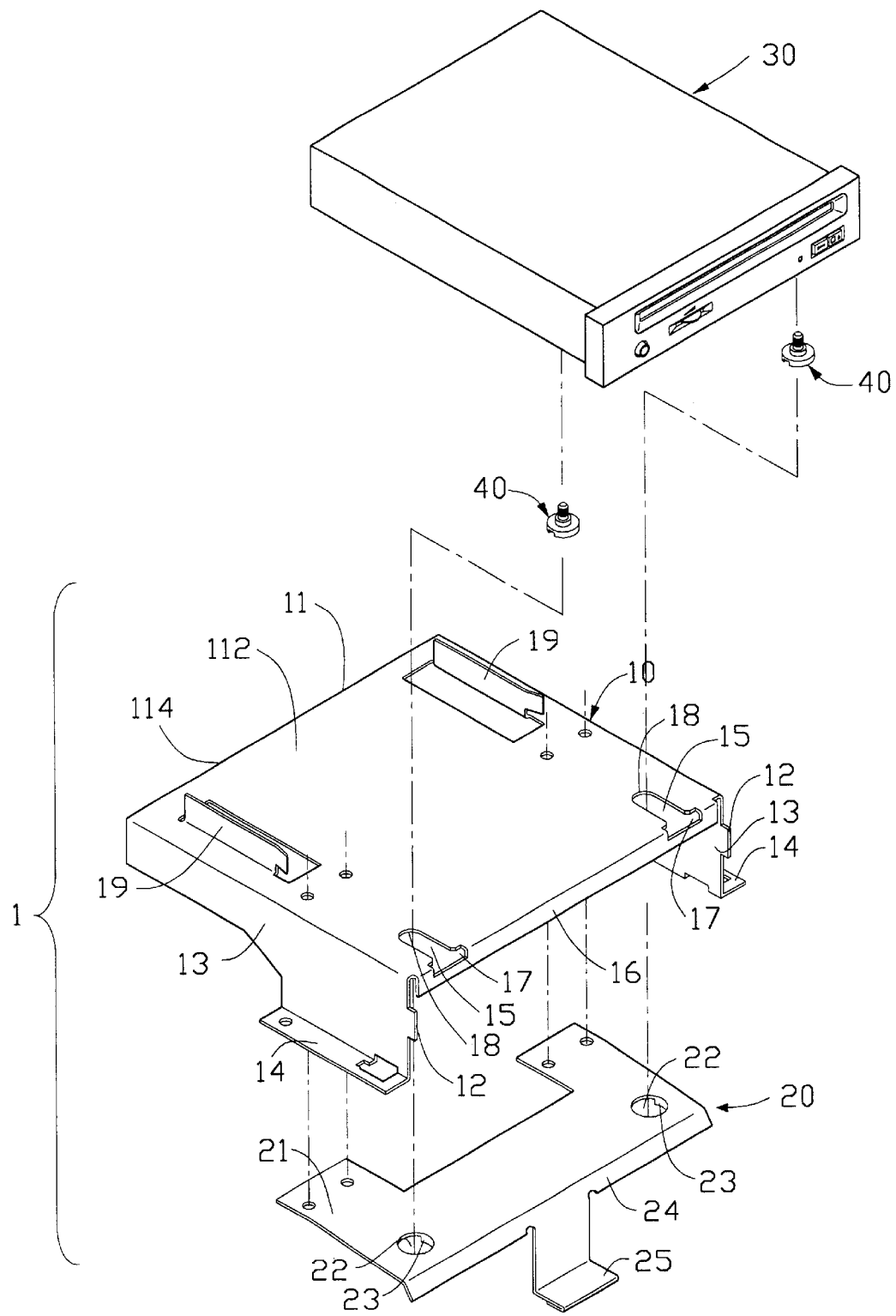
FIG. 2 is an exploded view of the data storage device mounting apparatus comprising a bracket and a flexible plate, wherein a data storage device with screws is to be mounted thereon.

Referring to FIG. 2, the bracket 10 comprises a base plate 11 having a first face 112 for supporting the data storage device 30 and a second face 114 opposite the first face. Two opposite side walls 13 depend downward from opposite sides of the base plate 11 and two bottom plates 14 outwardly extend from the bottom edges of the side walls 13.

The front of each side wall 13 forms a tab 12. The base-plate 11 has two locking holes 15 in its front portion to accommodate the securing means attached to a bottom of the data storage device 30 while permitting the data storage device 30 to slide backward into a fully inserted position. The securing means may be a screw 40, or any suitable means. The front portions of the locking holes 15 are wider than the rear portions. Back ends of the locking holes 15 each define an arc 18. The base plate 11 forms a front flange 16 depending downward from a forward edge thereof. A pair of entrance openings 17 is defined in the front flange 16 in communication with corresponding locking holes 15. The base plate 11 further forms a pair of guide rails 19 on the first face 112.

The flexible plate 20 comprises a flat board 21 defining a pair of through holes 22 at opposite sides thereof, a flange 24 depending from a forward edge of the flat board 21 and an L-shaped operating portion 25 depending from a center of the flange 24. The front rim of each through hole 22 is formed into a chimb 23.

In assembly, a rear end of the flat board 21 is firmly attached to the second face 114 of the bracket 10, allowing the front end of the flat board 21 to be moved downward away from the front portion of the bracket 10. The through holes 22 of the flat board 21 align with a rear portion of the locking holes 15 of the bracket 10. The bracket 10 with the flexible plate 20 attached is mounted in the chassis 5, the tabs 12 of the bracket engaging with the slots 55 of the front panel 52, and the bottom plates 14 of the bracket 10 being attached to the floor 51 of the chassis 5. The L-shape operating portion 25 extends through the opening 54 of the front panel 52.

The data storage device 30 is supported on the first face 112 of the base plate 11. As better shown in FIG. 3, a bottom of the data storage device 30 defines a pair of screw holes 31 wherein screws 40 are mounted. As best shown in FIG. 4, the screw 40 comprises a threaded shaft 43, a head 41 and a step 42 connected therebetween. The diameter of the step 42 is about equal to the width of the narrower portion of the locking hole 15. The diameter of the head 41 is far bigger than the width of the narrower portion of the locking hole 15 and is about equal to the width of the entrance 17.

Figure 3:
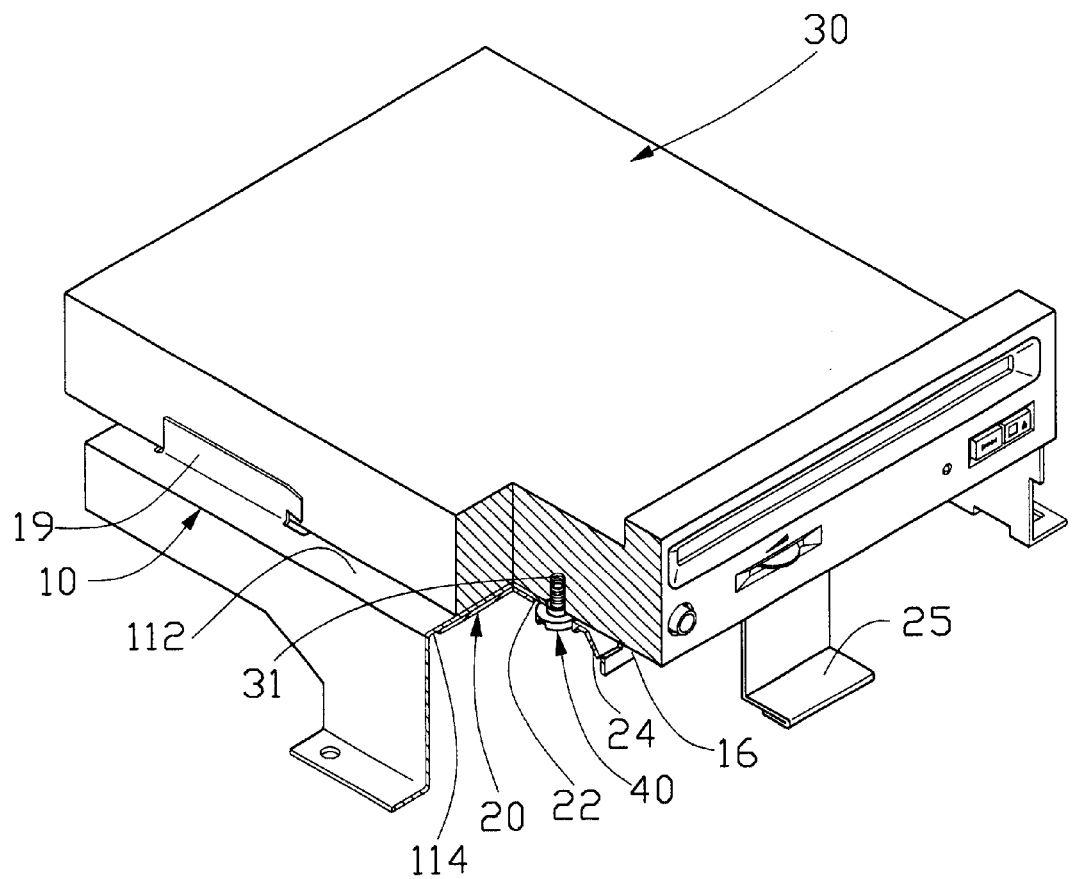
FIG. 3 is a perspective view of the data storage device mounting apparatus wherein a portion is cut open showing the assembly relation of the mounting apparatus.
Figure 4:
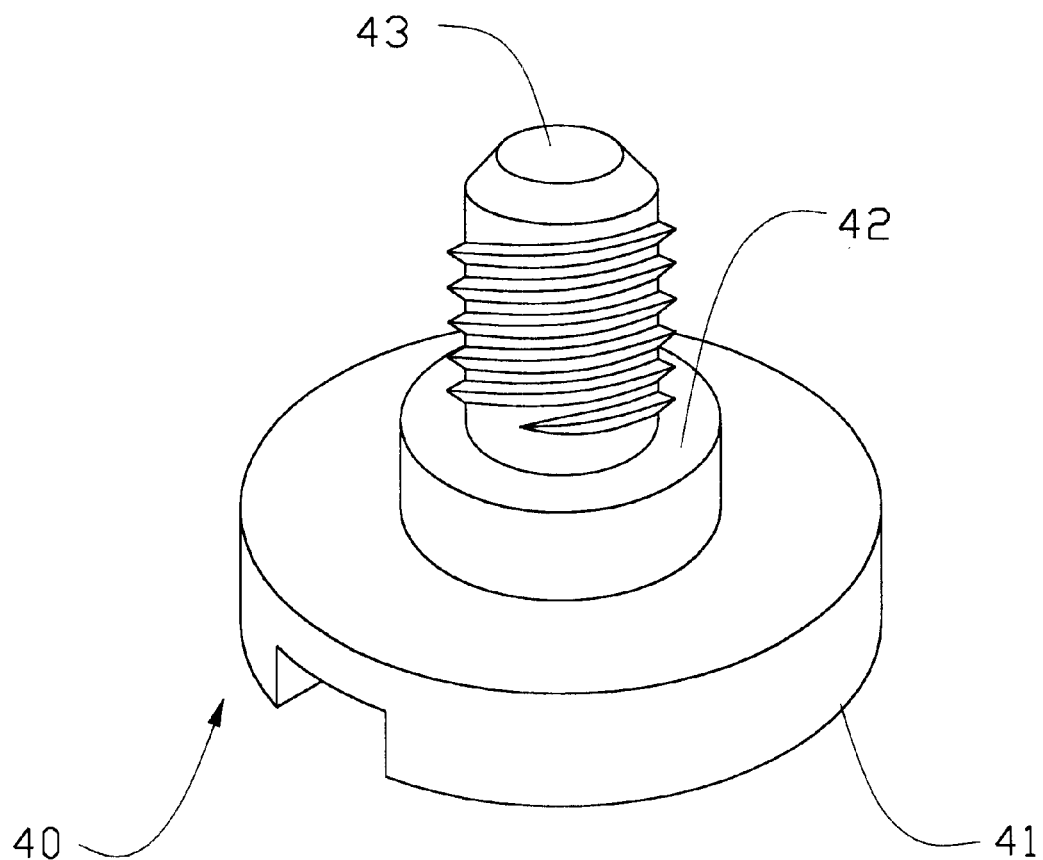
FIG. 4 is an enlarged perspective view of the screw.
Figure 5:
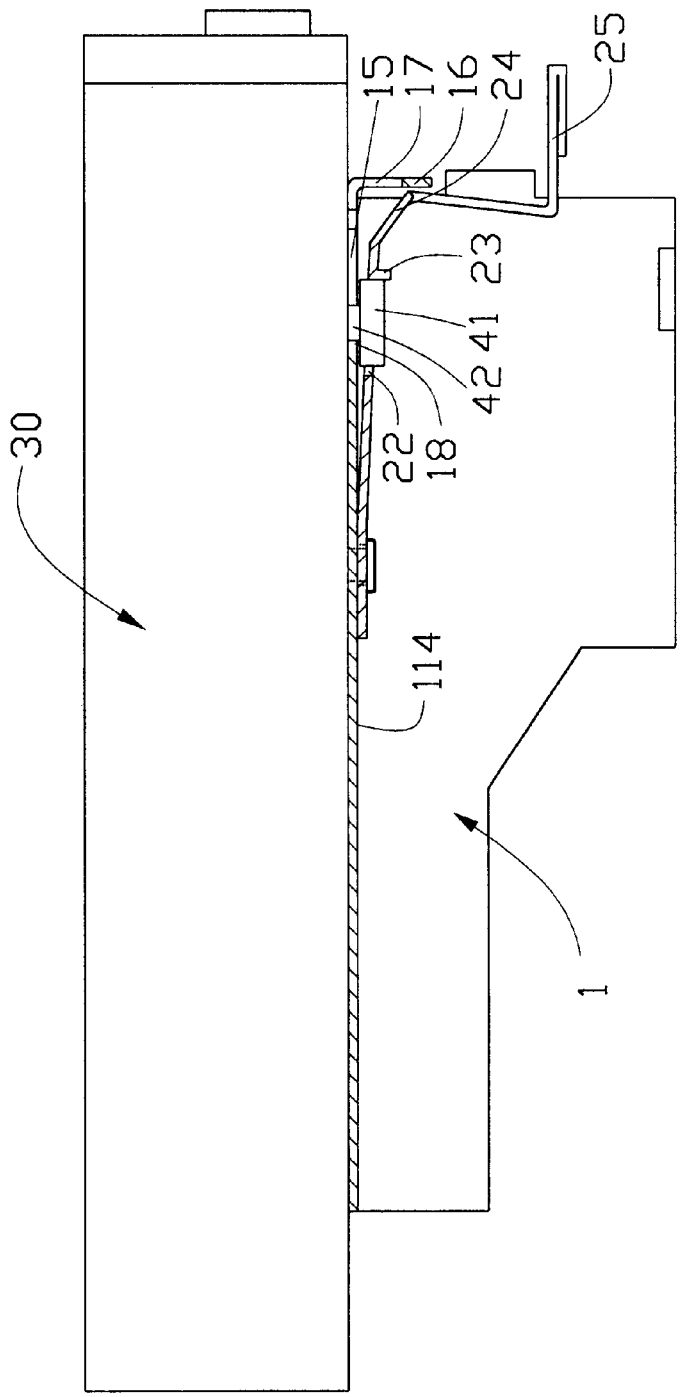
FIG. 5 is a side cross sectional view of the mounting apparatus showing an initial stage of removal of the data storage device from the mounting apparatus.

Referring to FIGS. 1, 3 and 5, in use, the data storage device with screws 40 attached is inserted rear first into the first opening 53 so that the data storage device slides between the guide rails 19 and is supported by the base plate 11. The heads 41 of the screws 40 slide through the entrance 17 in the front flange 16 of the base plate 11 and exert a downward force against the flange 24 of the flexible plate 20, forcing the forward portion of the flexible plate 20 downward away from the base plate 17. The steps 42 enter the locking holes 15 and backwardly slide to rear ends of the locking holes 15, the attached heads 41 sliding beneath the second face 114 of the bracket 10 while the data storage device 30 slides backward to a fully inserted position. At the fully inserted position, the heads 41 align with the through holes 22 and the flexible plate 20 snaps to a position flush with the second face 114. The chimb 23 of the through holes 22, therefore, block the forward sliding movement of the data storage device 30, and the arc 18 blocks the backward sliding movement. Thus the data storage device 30 is secured within the chassis 5. Additionally, the pair of guide rails 19 eases mounting of the data storage device 30 on the bracket 10.

Figure 6:
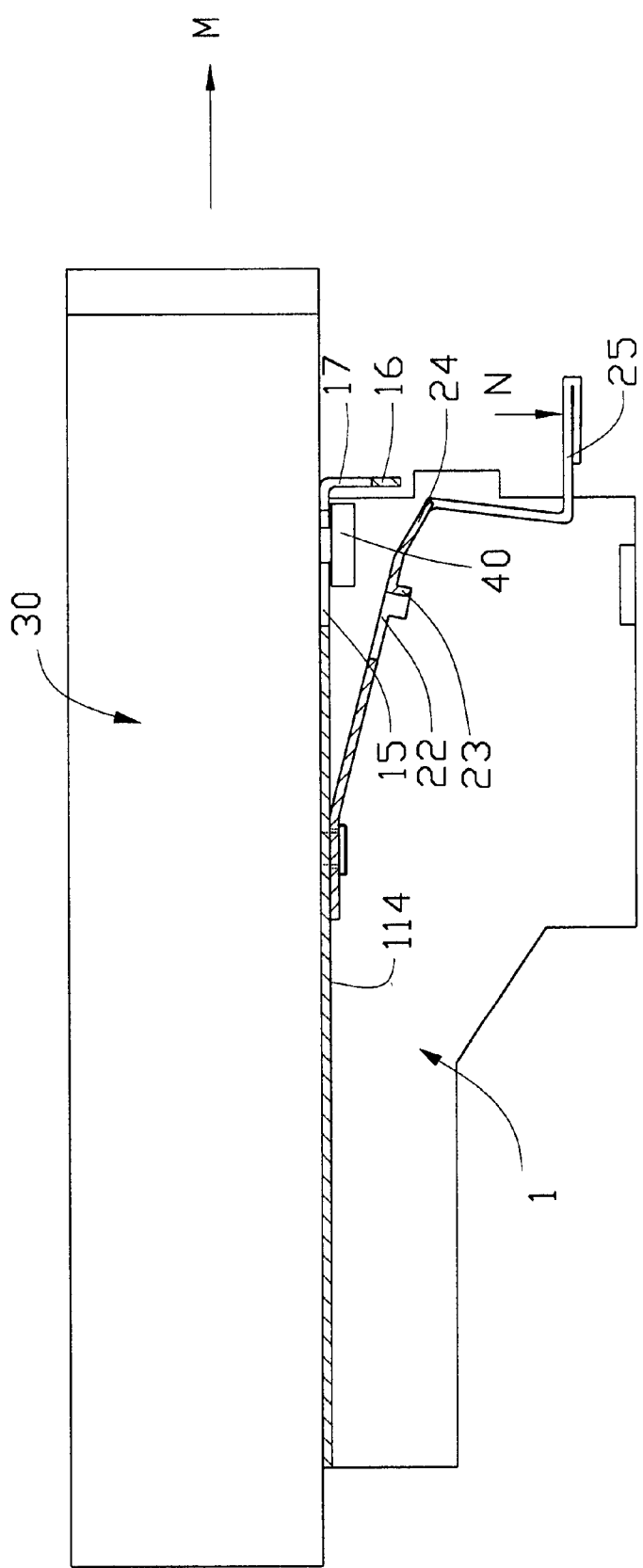
FIG. 6 is a side cross sectional view of the mounting apparatus showing an intermediate stage of removal of the data storage device from the mounting apparatus.

FIGS. 5–6 illustrate the removal of the data storage device 30 from the computer housing. To remove the data storage device 30, the operating portion 25 is pressed in the direction N shown in FIG. 6, moving the front portion of the flexible plate 20 away from the front portion of the bracket 10 and disengaging the through holes 22 from the heads 41 of the screws 40, while simultaneously drawing the data storage device 30 in the direction M out of the elongate first opening 53. As can be seen from the forgoing description, the removal of the data storage device 30 is accomplished without removal of the side or top panels or other components.

While the present invention has been described in reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

We claim:

1. A mounting apparatus adapted to mount a data storage device in a computer housing, comprising:
   a bracket being adapted to be supported in a computer housing, the bracket having a first face for supporting a data storage device, a second face opposite the first face, and at least one locking hole in a front portion thereof;
   a securing means mounted to a bottom of the data storage device, the securing means being moveable with the data storage device to be slid into the at least one locking hole of the bracket; and
   a flexible plate having a rear end securely fixed to the second face of thebracket and a front end, the front end having an operating portion extending out of the computer housing for being operable to move the front end away from the front portion of the bracket, the flexible plate having at least one through hole engaging with the securing means to releasably block a sliding movement of the data storage device on the first face of the bracket.

2. The mounting apparatus as claimed in claim 1, wherein the operating portion is L-shaped.

3. The mounting apparatus as claimed in claim 1, wherein the securing means of the data storage device comprises a screw having a threaded shaft mounted on the data storage device and a head; the at least one locking hole comprises a front end for permitting entrance of the head and a rear end for regulating a rearward movement of the screw; and the head extends into the at least one through hole.

4. The mounting apparatus as claimed in claim 1, wherein the through hole has a chimb at a front rim thereof.

5. The mounting apparatus as claimed in claim 1, wherein the bracket has a base-plate containing said first face and said second face and two side walls extending downwardly from two opposite sides of the base-plate.

6. The mounting apparatus as claimed in claim 1, wherein the bracket defines a pair of guide rails on the first face.

7. A computer housing comprising:
   a chassis having a floor and a front panel with an inner space and an elongate opening in the front panel;
   a mounting apparatus being received in the inner space for installation and removal of a data storage device through the elongate opening, the mounting apparatus comprising a bracket, a securing means and a flexible plate, wherein the bracket has a first face for supporting a data storage device, a second face opposite the first face, and at least one locking hole in a front portion thereof; the securing means is mounted to a bottom of the data storage device and is moveable with the data storage device to be slid into the at least one locking hole of the bracket;

and the flexible plate has a rear end securely fixed to the second face of the bracket and a front end; the front end has an operating portion extending out of the computer housing for being operable to move the front end away from the front portion of the bracket; the flexible plate further has at least one through hole engaging with the securing means to releasably block a sliding movement off the data storage device on the first face of the bracket.

8. The computer housing as claimed in claim 7, wherein the front panel further defines an opening for said operating portion to extend therethrough.

9. The computer housing as claimed in claim 7, wherein the operating portion is L-shaped.

10. The computer housing as claimed in claim 7, wherein there are slots defined in the front panel.

11. The computer housing as claimed in claim 10, wherein there are tabs extending from the front of the bracket for engaging with said slots to secure the bracket in the computer housing.

12. The mounting apparatus as claimed in claim 7, wherein the securing means of the data storage device comprises a screw having a threaded shaft mounted on the data storage device and a head; the at least one locking hole comprises a front end for permitting entrance of the head and a rear end for regulating a rearward movement of the screw; and the head extends into the at least one through hole.

13. The mounting apparatus as claimed in claim 7, wherein the through hole has a chimb at a front rim thereof.

14. The computer housing as claimed in claim 7, wherein the bracket has a base-plate containing said first face and said second face and two side walls extending downwardly from two opposite sides of the base-plate.

15. The computer housing as claimed in claim 7, wherein the bracket further defines a pair of guide rails on the base plate.

16. A computer device comprising:

a chassis including front panel defining an elongated first opening and a second opening under the first opening;

a mounting apparatus positioned in an interior of the chassis behind the front panel, said mounting apparatus including a fixed base generally extending horizontally in alignment with a bottom edge of the first opening;

a flexible plate having a rear end securely fixed to an undersurface of the base and a front end, the front end having an operating portion extending out of the second opening of the chassis for being operable to move the front end away from a front portion of the base; and a data storage device dimensioned in compliance with the first opening and adapted to be removably inserted into the interior space through said first opening and positioned on the base; wherein means is defined on both the flexible plate and the data storage device to lock the flexible plate and the data storage device with each other in an insertion direction of the data storage device to the chassis when said flexible plate is in a free status, while to disengage the flexible plate from the data storage device in said insertion direction when said flexible plate is downwardly deflected so as to allow withdrawal of the data storage device from the chassis.

* * * * *